(12) United States Patent
Sako et al.

(10) Patent No.: US 9,370,042 B2
(45) Date of Patent: Jun. 14, 2016

(54) TERMINAL APPARATUS AND STORAGE MEDIUM

(71) Applicant: SONY CORPORATION, Tokyo (JP)

(72) Inventors: Yoichiro Sako, Tokyo (JP); Mitsuru Takehara, Tokyo (JP); Kazuyuki Sakoda, Chiba (JP); Kazuhiro Watanabe, Tokyo (JP); Akira Tange, Tokyo (JP); Kazunori Hayashi, Tokyo (JP); Yasunori Kamada, Kanagawa (JP); Takayasu Kon, Tokyo (JP); Hiroyuki Hanaya, Kanagawa (JP); Yuki Koga, Tokyo (JP); Kohei Asada, Kanagawa (JP); Tomoya Onuma, Shizuoka (JP)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 14/045,422

(22) Filed: Oct. 3, 2013

(65) Prior Publication Data

US 2014/0106815 A1 Apr. 17, 2014

(30) Foreign Application Priority Data

Oct. 17, 2012 (JP) ................. 2012-229889

(51) Int. Cl.
*H04W 88/02* (2009.01)
*H04M 1/725* (2006.01)
*H04L 12/64* (2006.01)
*H04W 8/00* (2009.01)

(52) U.S. Cl.
CPC ........... *H04W 88/02* (2013.01); *H04L 12/6418* (2013.01); *H04M 1/7253* (2013.01); *H04M 1/72533* (2013.01); *H04M 2250/10* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 7,249,182 B1 * | 7/2007 | Heinonen et al. | ............. | 709/227 |
| 7,634,299 B2 * | 12/2009 | Mise et al. | ................... | 455/567 |
| 7,801,485 B2 * | 9/2010 | Watanabe et al. | ............ | 455/41.2 |
| 8,315,646 B2 * | 11/2012 | Karjalainen | ................ | 455/456.1 |
| 8,463,295 B1 * | 6/2013 | Caralis et al. | ............... | 455/456.3 |
| 8,483,613 B2 * | 7/2013 | Hua | ............................. | 455/41.2 |
| 8,654,977 B2 * | 2/2014 | Lee et al. | ....................... | 380/270 |
| 8,838,073 B2 * | 9/2014 | Sangster et al. | ........... | 455/412.1 |
| 8,914,024 B2 * | 12/2014 | Alharayeri | .................... | 455/434 |

(Continued)

FOREIGN PATENT DOCUMENTS

| | | |
|---|---|---|
| JP | 2009-536415 | 10/2009 |
| JP | 2012-108658 | 6/2012 |

*Primary Examiner* — Tuan A Tran
(74) *Attorney, Agent, or Firm* — Paratus Law Group, PLLC

(57) ABSTRACT

There is provided a terminal apparatus including a search unit configured to search for an apparatus group including an input apparatus or an output apparatus, the input apparatus and the output apparatus being wirelessly connectable to the terminal apparatus, a recommendation unit configured to recommend, to a user, a predetermined input apparatus or a predetermined output apparatus from the apparatus group that has been searched for by the search unit, in accordance with current time, a place in which the user is currently present, or an attribute of the user, and a setting unit configured to set the predetermined input apparatus or the predetermined output apparatus as an input unit or an output unit of the terminal apparatus, respectively, the predetermined input apparatus and the predetermined output apparatus having been recommended by the recommendation unit.

16 Claims, 10 Drawing Sheets

(56) References Cited

U.S. PATENT DOCUMENTS 8,929,819 B2 * 1/2015 Yang ............................ 455/41.2

2008/0009309 A1 * 1/2008 Gha ............................ 455/550.1
2011/0131224 A1 * 6/2011 Bodin et al. .................. 707/758

* cited by examiner

PRESENTATION OF CONNECTABLE INPUT DEVICES

-KEYBOARD

-MOUSE

-TABLET TERMINAL

IN CASE WHERE USER IS IN PRIVATE SPACE SUCH AS HOUSE

~22

PRESENTATION OF CONNECTABLE INPUT DEVICES

-KEYBOARD

-MOUSE

-TABLET TERMINAL

IN CASE WHERE USER IS IN PUBLIC SPACE SUCH AS OUTDOOR SPACE AND WORKING PLACE

FIG. 7

```
                          ┌─ 24
┌─────────────────────────────────────────┐
│  PRESENTATION OF CONNECTABLE DISPLAY DEVICES │
│                                         │
│     ▓▓-TELEVISION APPARATUS▓▓           │
│                                         │
│     -NOTEBOOK PC DISPLAY                │
│                                         │
│     -TABLET TERMINAL                    │
│                                         │
│     -PORTABLE REPRODUCTION APPARATUS    │
│                                         │
└─────────────────────────────────────────┘
```

IN CASE WHERE USER IS IN PRIVATE SPACE SUCH
AS HOUSE IN DAYTIME

```
                          ┌─ 26
┌─────────────────────────────────────────┐
│  PRESENTATION OF CONNECTABLE DISPLAY DEVICES │
│                                         │
│     -TELEVISION APPARATUS               │
│                                         │
│     -NOTEBOOK PC DISPLAY                │
│                                         │
│     ▓▓-TABLET TERMINAL▓▓                │
│     ▓▓-PORTABLE REPRODUCTION APPARATUS▓▓│
│                                         │
└─────────────────────────────────────────┘
```

IN CASE WHERE USER IS IN PRIVATE SPACE SUCH
AS HOUSE IN NIGHTTIME

PRESENTATION OF CONNECTABLE AUDIO OUTPUT DEVICE

-SPEAKER OF AUDIO APPARATUS

-SPEAKER OF TELEVISION APPARATUS

-SPEAKER OF NOTEBOOK PC

-SPEAKER OF PORTABLE REPRODUCTION APPARATUS

IN CASE WHERE USER IS IN PRIVATE SPACE SUCH
AS HOUSE IN DAYTIME

30

PRESENTATION OF CONNECTABLE AUDIO OUTPUT DEVICE

-SPEAKER OF AUDIO APPARATUS

-SPEAKER OF TELEVISION APPARATUS

-SPEAKER OF NOTEBOOK PC

-SPEAKER OF PORTABLE REPRODUCTION APPARATUS

IN CASE WHERE USER IS IN PRIVATE SPACE SUCH
AS HOUSE IN NIGHTTIME

TERMINAL APPARATUS AND STORAGE MEDIUM

CROSS REFERENCE TO RELATED APPLICATIONS

This application claims the benefit of Japanese Priority Patent Application JP 2012-229889 filed Oct. 17, 2012, the entire content of which is incorporated herein by reference.

BACKGROUND

The present disclosure relates to a terminal apparatus and a storage medium. Generally speaking, electronic apparatuses independently operate. For example, information processing apparatuses such as a personal computer (PC), a smartphone, and a tablet terminal each include a dedicated input/output device, and the device included in the information processing apparatus is usually used for input to and output from the information processing apparatus.

In recent years, a control system has been proposed that enhances more convenience by operating information processing apparatuses in corporation with each other. For example, JP 2009-536415T discloses a system for managing, routing, and controlling devices and inter-device connections located within an environment to manage and control the environment by use of a client terminal.

JP 2012-108658A discloses a system for operating applications of a notebook PC and a tablet PC in cooperation with each other such that the same image is displayed on the notebook PC as an image displayed on the display of the tablet PC.

SUMMARY

However, nothing has been mentioned regarding automatic search of a mobile terminal such as a smartphone and a tablet terminal for an input/output apparatus though JP 2009-536415T has certainly disclosed a technique for optimizing an A/V presentation environment.

Although JP 2012-108658A has disclosed a one-to-one connection between PCs, nothing has also been mentioned regarding automatic search of a mobile terminal such as a smartphone and a tablet terminal for an input/output apparatus.

As described above, since information processing apparatuses such as a smartphone and a tablet terminal each include a dedicated input/output device, input to and output from the information processing apparatus are possible outside. However, even when a more appropriate input/output apparatus is present around the information processing apparatus, the input/output device included in the information processing apparatus is used.

The present disclosure therefore proposes a terminal apparatus and a storage medium that are novel and improved, and can set an input apparatus or an output apparatus around the terminal apparatus as an optimal input unit or an optimal output unit for the terminal apparatus in accordance with a situation.

According to an embodiment of the present disclosure, there is provided a terminal apparatus including a search unit configured to search for an apparatus group including an input apparatus or an output apparatus, the input apparatus and the output apparatus being wirelessly connectable to the terminal apparatus, a recommendation unit configured to recommend, to a user, a predetermined input apparatus or a predetermined output apparatus from the apparatus group that has been searched for by the search unit, in accordance with current time, a place in which the user is currently present, or an attribute of the user, and a setting unit configured to set the predetermined input apparatus or the predetermined output apparatus as an input unit or an output unit of the terminal apparatus, respectively, the predetermined input apparatus and the predetermined output apparatus having been recommended by the recommendation unit.

According to another embodiment of the present disclosure, there is provided a non-transitory computer-readable storage medium having a program stored therein, the program causing a computer to function as a search unit configured to search for an apparatus group including an input apparatus or an output apparatus, the input apparatus and the output apparatus being wirelessly connectable to a terminal apparatus, a recommendation unit configured to recommend, to a user, a predetermined input apparatus or a predetermined output apparatus from the apparatus group that has been searched for by the search unit, in accordance with current time, a place in which the user is currently present, or an attribute of the user, and a setting unit configured to set the predetermined input apparatus or the predetermined output apparatus as an input unit or an output unit of the terminal apparatus, respectively, the predetermined input apparatus and the predetermined output apparatus having been recommended by the recommendation unit.

As described above, according to embodiments of the present disclosure, it becomes possible to set an input apparatus or an output apparatus around a terminal apparatus as an optimal input unit or an optimal output unit for the terminal apparatus in accordance with a situation.

BRIEF DESCRIPTION OF THE DRAWINGS

FIG. 4 is a diagram illustrating an example of display screens indicating results obtained by searching for and recommending an input device group according to the first embodiment;

FIG. 7 is a diagram illustrating an example of display screens indicating results obtained by searching for and recommending a display device group according to the second embodiment;

FIG. 10 is a diagram illustrating an example of display screens indicating results obtained by searching for and recommending an audio output device group according to the third embodiment.

DETAILED DESCRIPTION OF THE EMBODIMENT(S)

Figure 1:
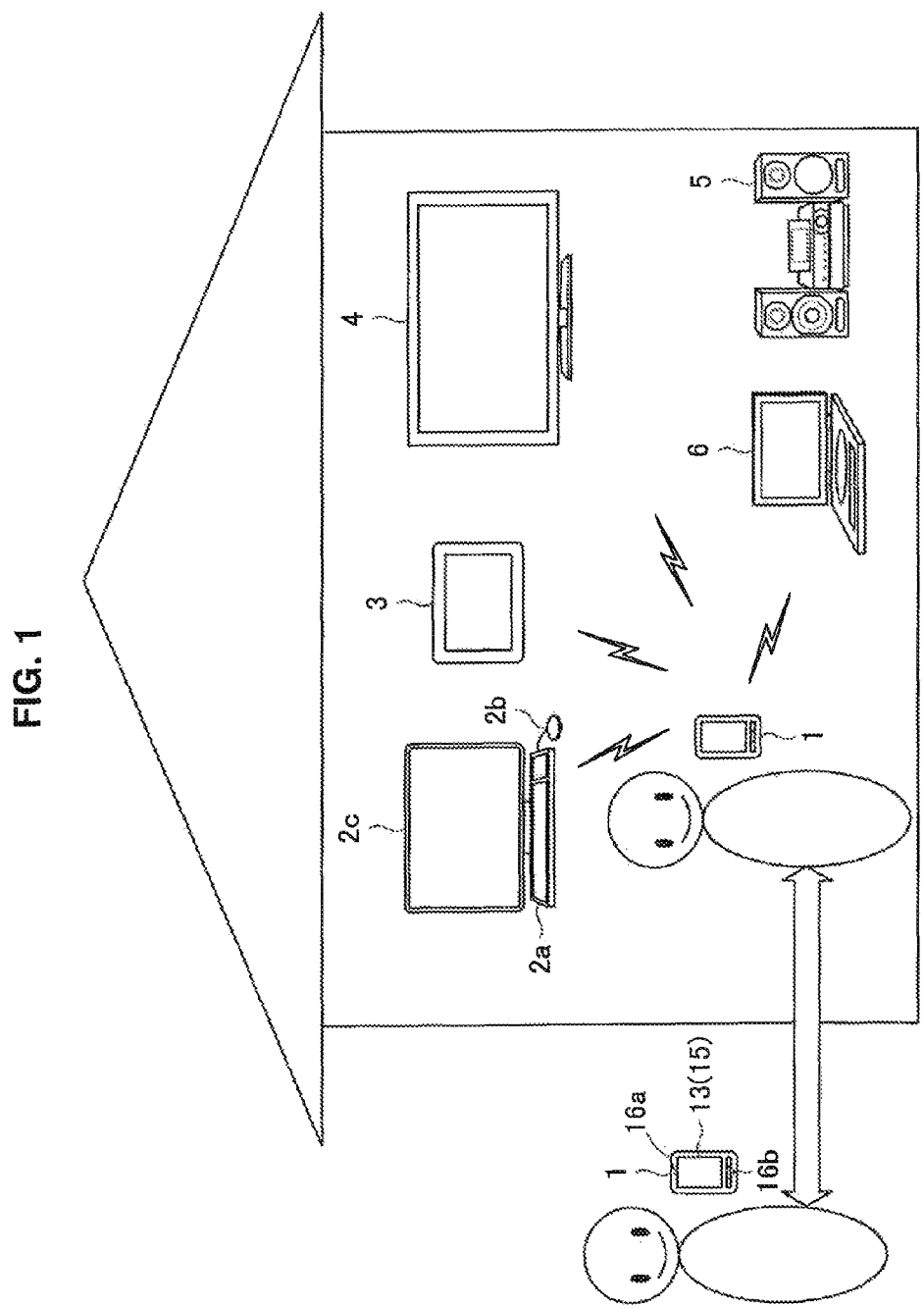
FIG. 1 is a diagram for describing an overview of a setting system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Setting System According to Embodiment of Present Disclosure
2. Example of Main Configuration of Terminal Apparatus According to Present Embodiment
3. Embodiments
3-1. First Embodiment
3-2. Second Embodiment
3-3. Third Embodiment
4. Conclusion <1. Overview of Setting System According to Embodiment of Present Disclosure>

First, with reference to FIG. 1, an overview of a setting system according to an embodiment of the present disclosure will be described.

FIG. 1 is a diagram for describing an overview of a setting system according to an embodiment of the present disclosure. The setting system according to the present embodiment is applied to a terminal apparatus 1 that is illustrated in FIG. 1 and held by a user. In the example illustrated in FIG. 1, a smartphone is shown as a specific example of the terminal apparatus 1. However, the terminal apparatus 1 according to the embodiments of the present disclosure is not limited to a smartphone, and may also be a mobile terminal such as a mobile telephone terminal, a personal digital assistant (PDA), a tablet terminal, and a game device.

As illustrated in FIG. 1, the terminal apparatus 1 includes a display unit 13 configured to display an image, a manipulation input unit 15 configured to be integrated with the display unit 13 and to detect a touch manipulation, a speaker 16a configured to output an audio signal, and a microphone 16b configured to input an audio signal. A user uses the input/output unit (such as the display unit 13, the manipulation input unit 15, the speaker 16a, and the microphone 16b) provided in the terminal apparatus 1, and can input data to and output data from the terminal apparatus 1 anywhere.

Mobile terminals are generally designed to be light and small preferentially to high performance such that a size of each mobile terminal does not intervene with a user carrying the mobile terminal. In particular, smartphones, which have been gaining widespread use in recent years, each have a display screen relatively overrepresented therein so that each smartphone is configured to have no ten keys for manipulation input. In this case, a software keyboard displayed on a touch panel display screen is used in order to input a letter and a figure. However, different from a physical button, a user does not feel a button pushed down on a software keyboard. In addition, since a user does not tactually confirm a position of a button, the user often makes a lot of mistakes, which means that the user touches a next button image in error, for example. The user is therefore much stressed. If a display screen is configured to be relatively overrepresented in the mobile terminal, the screen is still smaller than the screen of a general home television apparatus and the like because the mobile terminal is made small so as to be easy to carry. Consequently, it is not comfortable to watch a picture, a movie, and the like in the mobile terminal.

In addition, for example, when a user is in the house or in the working place, and when there is a high-performance input/output apparatus (input/output device) around the user, the user has no choice but to use an input/output unit that is provided in a mobile terminal such as a smartphone and attains relatively low performance.

In view of such circumstances, there is provided a setting system according to each embodiment of the present disclosure. If the setting system according to each embodiment of the present disclosure is used, it is possible to set an input apparatus or an output apparatus around a terminal apparatus as an optimal input unit or an optimal output unit for the terminal apparatus in accordance with a situation.

For example, as illustrated in FIG. 1, when a user goes out and there is no high-performance input/output device around the user, an input unit/output unit provided in the terminal apparatus 1 is used to for data input and data output. Meanwhile, as illustrated in FIG. 1, for example, a relatively high-performance input/output device is expected around a user in the house or in the working place. The relatively high-performance input/output device includes, for example, a keyboard 2a, a mouse 2b, a display 2c of a desktop PC, a tablet terminal 3, a television apparatus 4, a speaker 5 of an audio apparatus, and a portable reproduction apparatus 6. In the present embodiment, a high-performance input/output device present around the terminal apparatus 1 is used to input data to and output data from the terminal apparatus 1 in such an environment. That is, an input apparatus or an output apparatus around the terminal apparatus 1 is set as an optimal input unit or an optimal output unit for the terminal apparatus. Specifically, the terminal apparatus 1 connects to the input apparatus or the output apparatus around the terminal apparatus 1, and transmits and receives data.

A user can hereby use the keyboard 2a, the mouse 2b, and the tablet terminal 3, which are easier to manipulate than the manipulation input unit 15 of the terminal apparatus 1, to input data to the terminal apparatus 1. A user can also use a display 2c of a notebook PC, the tablet terminal 3, the television apparatus 4, and the portable reproduction apparatus 6, which each have a larger screen and higher resolution than the display unit 13 of the terminal apparatus 1, to view an image to be reproduced in the terminal apparatus 1. A user can also use the speaker 5 of the audio apparatus and a speaker of the television apparatus 4, which attain higher performance (have multiple speakers and high sound quality) than the speaker 16a of the terminal apparatus 1, to listen to audio signals to be reproduced in the terminal apparatus 1.

Next, with reference to FIG. 2, an example of an inner configuration of the terminal apparatus 1 will be described to which the setting system according to the present embodiment is applied.

<2. Example of Main Configuration of Terminal Apparatus According to Present Embodiment>

Figure 2:
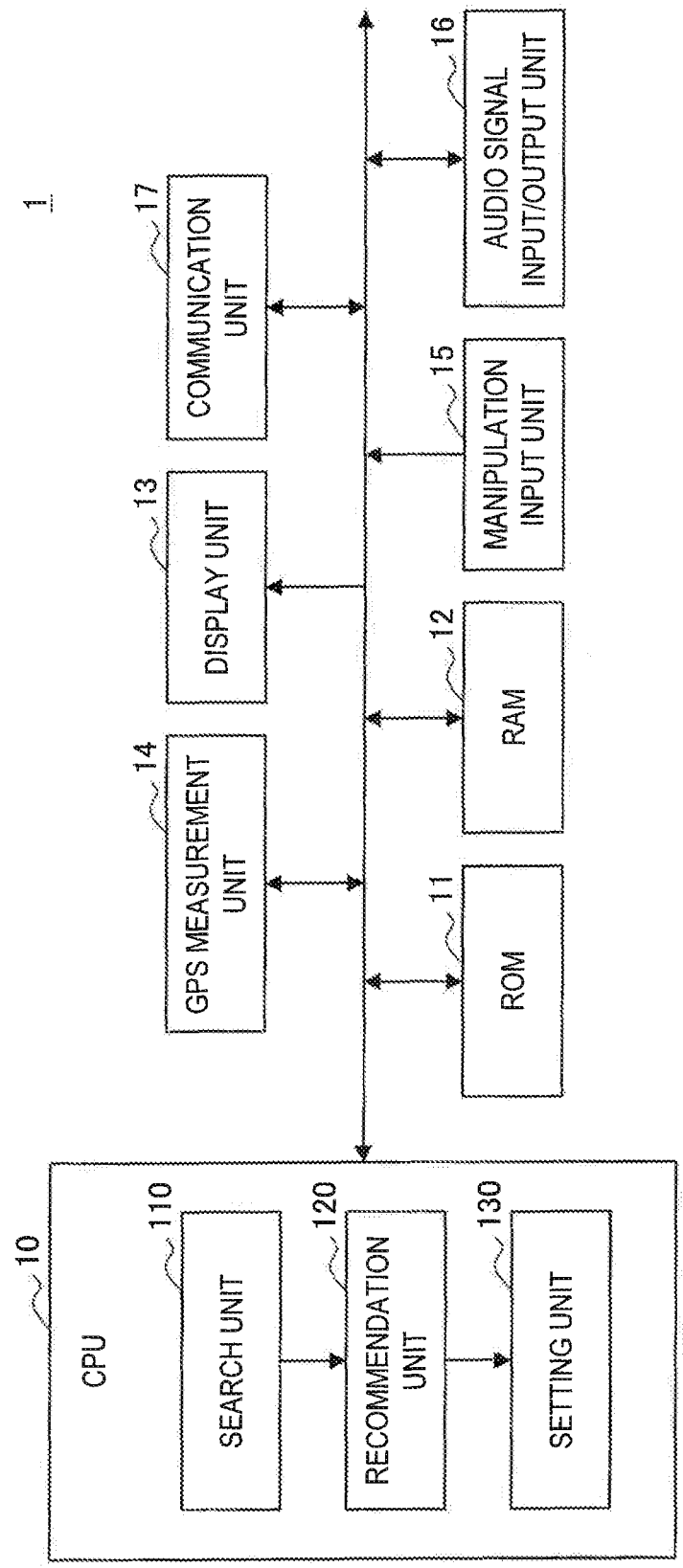
FIG. 2 is a block diagram illustrating an example of a main configuration of a terminal apparatus according to the present embodiment.

FIG. 2 is a block diagram illustrating an example of a main configuration of the terminal apparatus 1 according to the present embodiment. As illustrated in FIG. 2, the terminal apparatus 1 includes a central processing unit (CPU) 10, read only memory (ROM) 11, random access memory (RAM) 12, a display unit 13, a global positioning system (GPS) measurement unit 14, a manipulation input unit 15, an audio signal input/output unit 16, and a communication unit 17. Each configuration will be described below in detail.

(CPU)

The CPU 10 is a control unit configured to control each configuration of the terminal apparatus 1. More specifically, the CPU 10 according to the present embodiment functions, as illustrated in FIG. 2, as a search unit 110, a recommendation unit 120, and a setting unit 130.

Search Unit

The search unit 110 searches for an apparatus group including an input apparatus (input device) or an output apparatus (output device) that is wirelessly connectable to the terminal apparatus 1. For example, the search unit 110 searches for (detects) input apparatuses or output apparatuses present around the search unit 110 through the communication unit 17, and outputs information regarding the input/output apparatus group (that is an apparatus group including the input apparatuses or the output apparatuses), which has been searched for, to the recommendation unit 120. The input/output apparatus group that has been searched for by the search unit 110 may be presented to the display unit 13 in accordance with control of the CPU 10.

Recommendation Unit

The recommendation unit 120 recommends, to a user, a predetermined optimal input apparatus or a predetermined optimal output apparatus from the apparatus group that has been searched for by the search unit 110 in accordance with, for example, current time, a place in which the user is currently present, an attribute of the user, performance of the apparatus group, and power consumption of the apparatus group.

For example, if a current position of the terminal apparatus 1 is a private space such as the house or a car, which has been registered in advance, the recommendation unit 120 prioritizes performance and recommends an input apparatus or an output apparatus to a user. For example, when the user is in the living room in the house, a speaker of an audio apparatus installed in the living room is set as an audio signal output unit of the terminal apparatus 1 and audio signals to be reproduced in the terminal apparatus 1 are output from the speaker of the audio apparatus. Meanwhile, if a current position of the terminal apparatus 1 is a public space such as the working place and a library, the recommendation unit 120 recommends an input/output apparatus other than the highest-performance input/output apparatus because it is difficult to personally use the highest-performance input/output apparatus. Consequently, for example, when the user is in the working place, a tablet terminal from large displays and tablet terminals present around the user is set as an image output unit and images to be reproduced in the terminal apparatus 1 are displayed in the tablet terminal.

Here, the recommendation unit 120 may determine a current position of the terminal apparatus 1 on the basis of positional information acquired by the GPS measurement unit 14, which will be described below, or on the basis of positional information input by the user.

The recommendation unit 120 may also recommend an optimal input/output apparatus in accordance with whether current time belongs to the daytime period or the night time period, which has been registered in advance. For example, since people less possibly view and listen to sounds of music and a movie at a very loud sound volume in the nighttime, the recommendation unit 120 recommends not a speaker of an audio apparatus or a television apparatus but a tablet terminal in the nighttime.

The recommendation unit 120 may recommend an optimal input/output apparatus in accordance with an attribute of a user. The attribute of the user is, for example, information indicating the sex, the age, the occupation, the body shape, or preferences of the user. The attribute of the user may be input by the user in advance, or may be learned by the CPU 10 from, for example, a manipulation history of the user. For example, the recommendation unit 120 may recommend the easiest input apparatus to manipulate in accordance with the age and the body shape (body size) of a user. If a user is a housewife, the recommendation unit 120 may recommend an input/output device disposed around the kitchen. For example, the recommendation unit 120 may learn preferences of a user on the basis of frequencies of use, typological errors, and typing speed of input devices, and may recommend an input device that the user likes to use.

In an electricity conservation period, the recommendation unit 120 may also recommend an (power saving) input/output device that consumes less power. If a battery-powered input/output device is set to be preferentially used, the recommendation unit 120 recommends a battery-powered input/output device. Meanwhile, if an input/output device using an AC power supply is set to be preferentially used, the recommendation unit 120 recommends an input/output device using an AC power supply.

The recommendation unit 120 may further recommend a predetermined optimal input/output device in accordance with content. For example, if the terminal apparatus 1 executes a game, the recommendation unit 120 recommends a controller for the game from input devices such as a keyboard, a mouse, and a controller. In addition, if the terminal apparatus 1 reproduces a movie, the recommendation unit 120 recommends an image output device (such as a television apparatus) that has the largest screen. If the terminal apparatus 1 reproduces classical music, the recommendation unit 120 recommends the highest-performance audio signal output device (such as a speaker of an audio apparatus).

Furthermore, if the terminal apparatus 1 includes sensors configured to detect, for example, biological information, palpitations, and brain waves of a user, the recommendation unit 120 may determine a mood (state) of the user on the basis of the biological information, the palpitations, and the brain waves of the user to recommend a predetermined optimal input/output device in accordance with the state. For example, if biological information, palpitations, and a value of brain waves satisfy a predetermined condition, the recommendation unit 120 determines that a user is sleepy and recommends a ceiling screen in the bedroom as an image output device.

As above, the specific method of recommending the recommendation unit 120 has been described. However, the recommendation unit 120 according to the embodiments of the present disclosure may combine multiple recommendation methods from the above-described recommendation methods to recommend a predetermined optimal input/output apparatus.

Relationships (association of current time, a place in which a user is currently present or an attribute of the user with a predetermined input apparatus or a predetermined output apparatus) indicating which input/output apparatus is recommended in what case may be accumulated in a database and stored in the ROM 11 in advance.

For example, an input/output apparatus that is recommended by the recommendation unit 120 may also be highlighted on the display unit 13 in accordance with control of the CPU 10.

Setting Unit

The setting unit 130 sets an input/output apparatus recommended by the recommendation unit 120 as an input/output unit of the terminal apparatus 1. More specifically, the setting unit 130 may set, as an input unit or an output unit of the terminal apparatus 1, an input apparatus or an output apparatus selected by a user from input/output apparatuses (apparatuses including an input apparatus and an output apparatus) recommended by the recommendation unit 120. The setting unit 130 may also automatically set an input/output apparatus recommended by the recommendation unit 120 as an input unit or an output unit of the terminal apparatus 1.

(ROM and RAM)

The ROM 11 stores, for example, programs for the CPU 10 to execute processes. The RAM 12 is used as a work area for the CPU 10 to execute the programs stored in the ROM 11.

(Display Unit)

For example, the display unit 13 displays various manipulation screens, presents an input/output apparatus group that has been searched for by the search unit 110, and highlights an input/output apparatus recommended by the recommendation unit 120 from the input/output apparatus group that has been searched for, in accordance with control of the CPU 10. The display unit 13 may be, for example, a liquid crystal display (LCD) or an organic light-emitting diode (OLED).

(GPS Measurement Unit)

The GPS measurement unit 14 is an example of a position information acquisition unit configured to acquire current position information of the terminal apparatus 1. Specifically, the GPS measurement unit 14 receives radio waves from a satellite of the GPS, and outputs information regarding latitude and longitude as a current position.

(Manipulation Input Unit)

The manipulation input unit 15 receives input of user manipulation. For example, the manipulation input unit 15 may be, as illustrated in FIG. 1, a touch panel that is integrated with the display unit 13. The manipulation input unit 15 may also be a manipulation button, a switch, and the like that are physically provided on the terminal apparatus 1.

(Audio Signal Input/output Unit)

The audio signal input/output unit 16 outputs and inputs audio signals in accordance with control of the CPU 10. Specifically, the audio signal input/output unit 16 may be, for example, the speaker 16a, an speaker amplifier unit for the speaker 16a, a D/A converter, the microphone 16b, a microphone/amplifier unit configured to amplify audio signals acquired by the microphone 16b, and an A/I) converter.

(Communication Unit)

The communication unit 17 is a communication interface configured to perform data communication with an external apparatus. For example, the communication unit 17 according to the present embodiment transmits signals used for searching for input/output apparatuses that are wirelessly connectable, and connects to an input apparatus or an output apparatus set by the setting unit 130 to transmit and receive data, in accordance with control of the CPU 10. The communication unit 17 may also communicate with an external apparatus in a scheme such as a wireless LAN, Bluetooth, Wi-Fi, near field communication (NFC), and intra-body communication.

As above, the example of the main configuration of the terminal apparatus 1 according to the present embodiment has been described in detail. Next, multiple embodiments will be used to specifically describe a process of setting an input/output apparatus, which is performed by the terminal apparatus 1 according to the present embodiment.

<3. Embodiments>

[3-1. First Embodiment]

First, as a first embodiment, an example process of setting an input device (input apparatus) will be described that is used in inputting text. It is generally necessary to use relatively small ten keys and a software keyboard displayed on the display unit of a mobile terminal for letter input when text is input into the mobile terminal. However, it is difficult to input a letter because people are not used to the manipulation. Accordingly, when a high-performance input device (such as a keyboard) that is used to input text is present around the terminal apparatus 1 according to the present embodiment, a user can input text from the high-performance input device by setting the input device as an input unit of the terminal apparatus 1. Next, with reference to FIG. 3, such a setting process according to the first embodiment will be specifically described.

Figure 3:
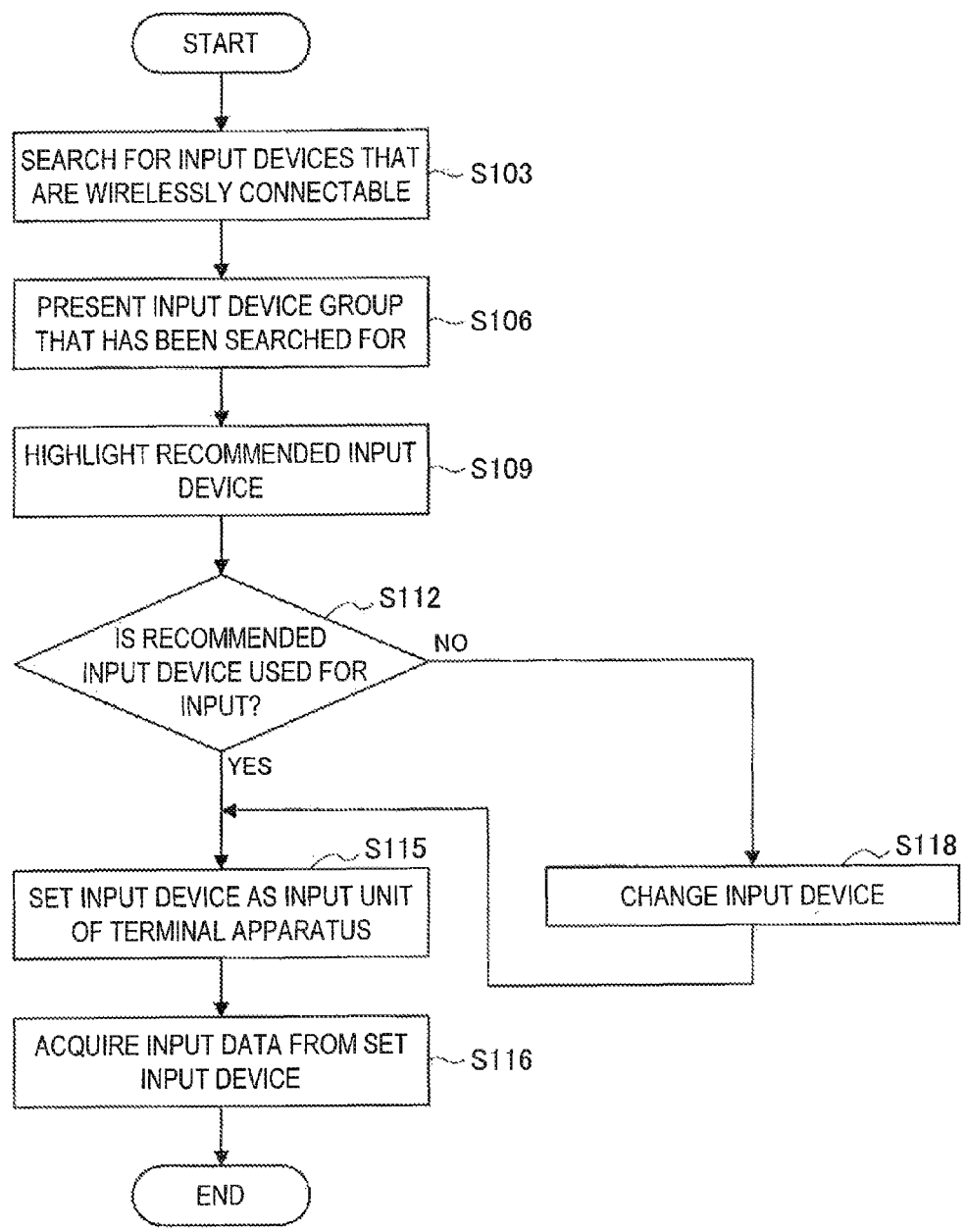
FIG. 3 is a flowchart illustrating an example process of setting an input device according to a first embodiment.

FIG. 3 is a flowchart illustrating an example process of setting an input device according to the first embodiment. As illustrated in FIG. 3, first, in step S103, the search unit 110 of the terminal apparatus 1 searches for input devices that are wirelessly connectable.

Subsequently, in step S106, the CPU 10 presents, to the display unit 13, an input device group that has been searched for by the search unit 110.

Next, in step S109, the recommendation unit 120 recommends a predetermined optimal input device in accordance with current time, a place in which a user is currently present, or an attribute of the user, for example. Specifically, for example, the recommendation unit 120 highlights an input device to be recommended from the input device group presented to the display unit 13. Here, with reference to FIG. 4, an example of display screens will be described that are displayed on the display unit 13.

As illustrated in FIG. 4, the display unit 13 presents, as a connectable input device, the input device group such as a "keyboard," a "mouse", and a "tablet terminal," which has been searched for by the search unit 110. In the example illustrated in FIG. 4, names of the input devices are displayed in the form of text. However, the present embodiment is not limited thereto. An image (icon) representing each of the input devices may be displayed.

When the recommendation unit 120 recommends a predetermined optimal input device in accordance with a place in which a user is currently present, that is, a private space such as the house, a keyboard, which has the highest function of inputting text is highlighted and recommended to the user, as illustrated in a display screen 20 of FIG. 4. Meanwhile, when a user is in a public space such as an outdoor space or the working place, and when a "keyboard," a "mouse," and a "tablet terminal" are searched for, the keyboard, which has the highest function of inputting text, is probably for public use. Accordingly, the recommendation unit 120 highlights an input device such as the tablet terminal other than the input device that has the highest function of inputting text, and presents the tablet terminal to the user, as illustrated in a display screen 22 of FIG. 4.

Subsequently, in step S112, the CPU 10 determines whether the recommended input device is OK (decided). Specifically, if the recommended input device is selected by a user, the CPU 10 determines that the recommended input device is OK. Alternatively, if a predetermined time has passed without any manipulation of a user, the CPU 10 may automatically determine that the recommended input device is OK.

Next, if it is determined that the recommended input device is OK (step S112/YES), the setting unit 130 sets, in step S115, the input device as an input unit of the terminal apparatus 1. Specifically, a connection is established to the input device such that the terminal apparatus 1 can receive input data from the communication unit 17.

In step S116, the terminal apparatus 1 receives input data that has been input by user manipulation through the set input device, and acquires the input data. For example, when a user is in the house, the user can hereby input text into the terminal apparatus 1 from a high-performance keyboard that wirelessly connects to the terminal apparatus 1.

Meanwhile, if an input device other than the recommended input device is selected by a user (step S112/NO), a setting target is changed, in step S118, to the selected input device. In S115, the setting unit 130 sets the selected input device as an input unit of the terminal apparatus 1.

As above, the example process of setting an input device (input apparatus) according to the present embodiment has been described. In addition, if a "next candidate button" (not shown) to be displayed on the display unit 13 is touched in S112 (S112/NO), the recommendation unit 120 may highlight a next recommendation candidate input device.

In the above-described setting process, a desired input device is selected on the display unit 13 of the terminal apparatus 1. However, the selection method according to the present embodiment is not limited thereto. A user may be able to select a desired input device by manipulating the desired input device. Next, with reference to FIG. 5, the specific description will be made.

Figure 5:
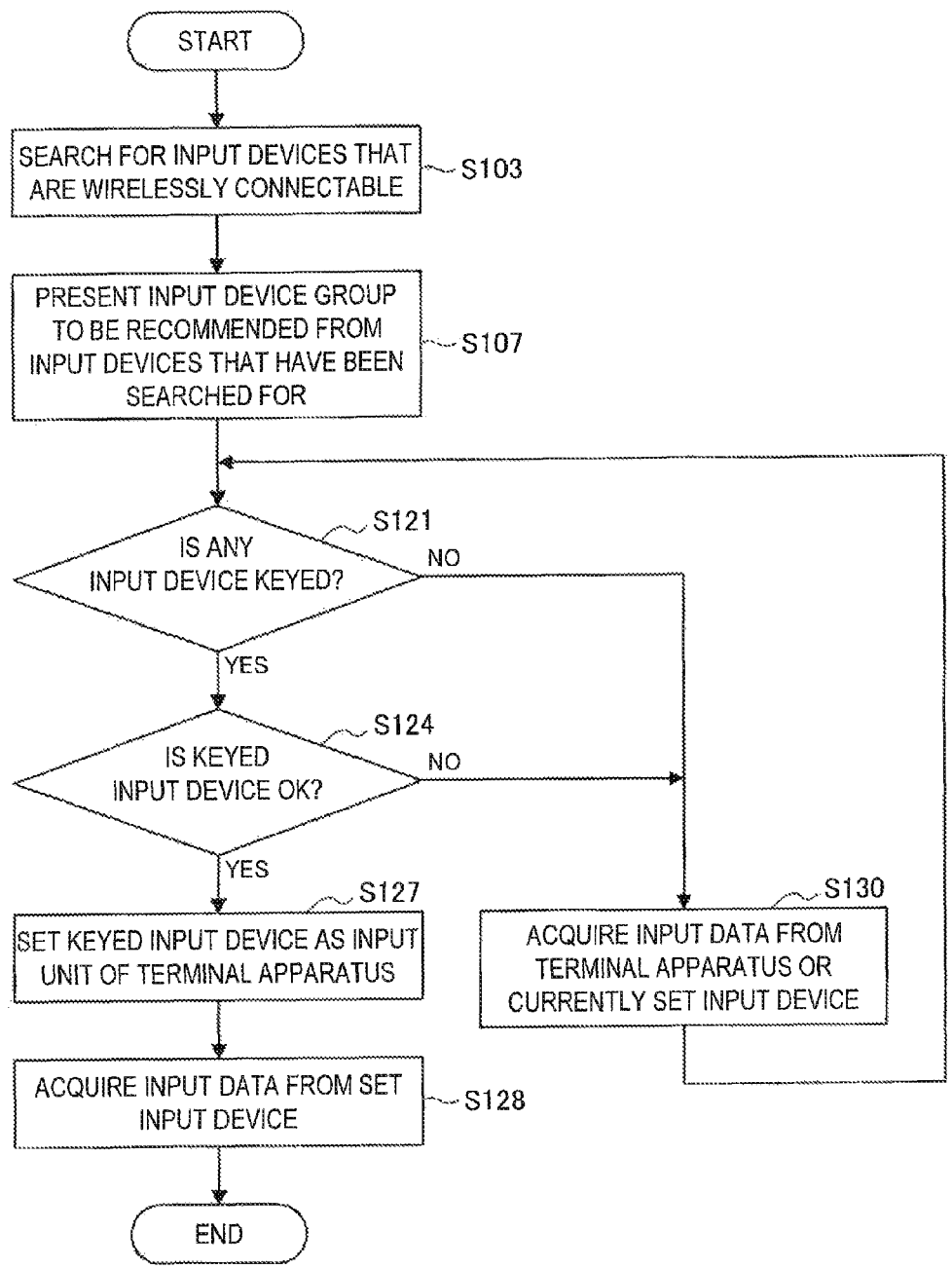
FIG. 5 is a flowchart illustrating another example process of setting an input device according to the first embodiment.

FIG. 5 is a flowchart illustrating another example process of setting an input device according to the first embodiment. As illustrated in FIG. 5, first, in step S103, the search unit 110 of the terminal apparatus 1 searches for input devices that are wirelessly connectable.

Subsequently, in step S107, the CPU 10 presents, to the display unit 13, an input device recommended by the recommendation unit 120 from the input device group that has been searched for by the search unit 110, and reports to a user. For example, here, the recommendation unit 120 recommends a high-performance input device that allows text to be input and is optimal for a user who is in the house.

Next, in step S121, the CPU 10 determines which input device is keyed. Specifically, for example, the communication unit 17 receives a keying report from a keyed input device to allow the CPU 10 to determine that the input device is keyed.

Subsequently, if an input device is keyed (step S121/YES), the CPU 10 determines, in step S124, whether the keyed input device is OK (decided). Specifically, the CPU 10 may ask a user, for example, by flashing the keyed device in a screen displayed on the display unit 13, whether the keyed input device is OK. The user decides selection of an input device, for example, by touching the flashing input device on the display unit 13 or touching an OK button to be displayed on the display unit 13.

Next, if it is determined that the keyed input device is OK (step S124/YES), the setting unit 130 sets, in step S127, the input device as an input unit of the terminal apparatus 1.

In step S128, the terminal apparatus 1 receives input data that has been input by user manipulation through the set input device, and acquires the input data. For example, when the user is in the house, the user can hereby key and select a high-performance keyboard that wirelessly connects to the terminal apparatus 1, thereby inputting text from the keyboard into the terminal apparatus 1.

To the contrary, if no input device is keyed in S121 (S121/NO), or if the keyed input device is not OK in step S124 (S124/NO), the process proceeds to step S130. In step S130, the CPU 10 acquires (receives) input data that has been input by user manipulation through the manipulation input unit 15 of the terminal apparatus 1 or the currently set input device. In this way, if the user does not desire to change the input device (S121/NO, S124/NO), the CPU 10 receives input by user manipulation without changing the setting.

As above, the other example process of setting an input device (input apparatus) according to the present embodiment has been described. In addition, as illustrated in FIG. 4, the CPU 10 may present, in step S106, the input device group that has been searched for, and may highlight an input device to be recommended from the presented input device group.

[3-2. Second Embodiment]

Next, as a second embodiment, an example process of setting a display device (image output apparatus) will be described that outputs various pieces of image data such as a picture, video, and a game. Generally speaking on mobile terminals, there is no way but to view an image by using a relatively small display screen that is provided on a mobile terminal. However, for example, when a user is in the house, there is probably a high-performance display apparatus installed around the user. Accordingly, if there is a high-performance display device (such as a television apparatus) configured to output an image around the terminal apparatus 1 according to the present embodiment, a user can view the image on the high-performance display device by setting the display device as a display unit of the terminal apparatus 1. Next, with reference to FIG. 6, such a setting process according to the second embodiment will be specifically described.

Figure 6:
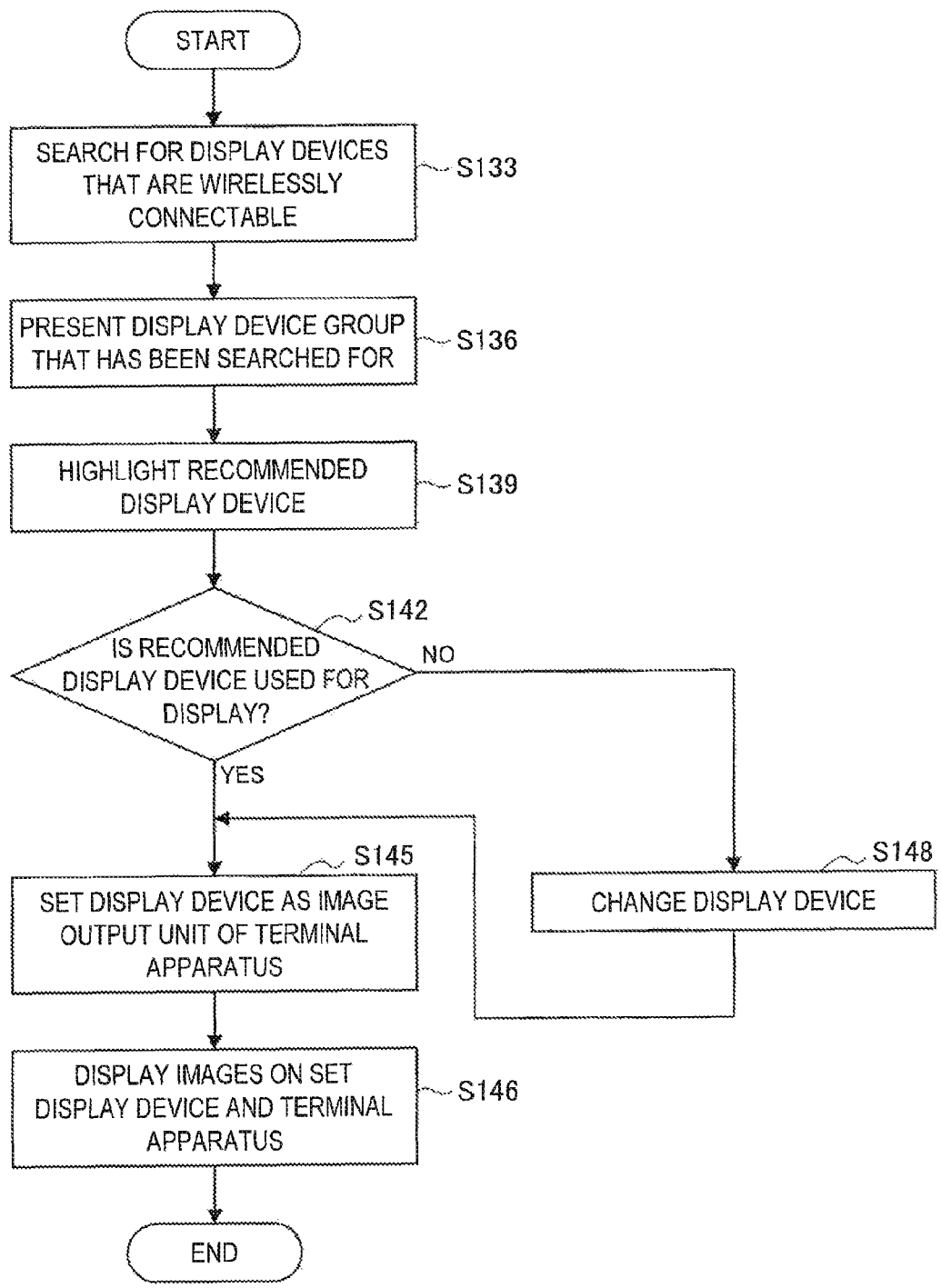
FIG. 6 is a flowchart illustrating an example process of setting a display device according to a second embodiment.

FIG. 6 is a flowchart illustrating an example process of setting a display device according to the second embodiment. As illustrated in FIG. 6, first, in step S133, the search unit 110 of the terminal apparatus 1 searches for display devices that are wirelessly connectable.

Subsequently, in step S136, the CPU 10 presents, to the display unit 13, a display device group that has been searched for by the search unit 110.

Next, in step S139, the recommendation unit 120 recommends a predetermined optimal display device in accordance with, for example, current time, a place in which a user is currently present, or an attribute of the user. Specifically, for example, the recommendation unit 120 highlights a display device to be recommended from the display device group presented to the display unit 13. Next, with reference to FIG. 7, an example of display screens to be displayed on the display unit 13 will be described.

As illustrated in FIG. 7, the display unit 13 presents, as connectable display devices, the display device group such as a "television apparatus," a "notebook PC display," a "tablet terminal," and a "portable reproduction apparatus," which has been searched for by the search unit 110. In the example illustrated in FIG. 7, names of the display devices are displayed in the form of text. However, the present embodiment is not limited thereto. An image (icon) representing each of the display devices may be displayed.

If the recommendation unit 120 recommends a predetermined optimal display device in accordance with a place in which a user is currently present and current time, which means, for example, that the user is in a private space such as the house and current time belongs to a daytime period, a display screen 24 illustrated in FIG. 7 is displayed. As illustrated in FIG. 7, a television apparatus that attains the highest performance in outputting an image (that means resolution and a size of the screen, for example) is highlighted in the display screen 24, and the television apparatus is recommended to a user. Meanwhile, if a user is in a private space such as the house and current time belongs to a nighttime period, the user probably prefers, for example, a tablet terminal, which the user can view at hand, to a large television apparatus. Accordingly, as illustrated in an display screen 26 of FIG. 7, the recommendation unit 120 highlights and recommends, to the user, a display device such as a tablet terminal and a portable reproduction apparatus other than a display device that attains the highest performance in outputting an image.

Subsequently, in step S142, the CPU 10 determines whether the recommended display device is OK (decided). Specifically, if the recommended display device is selected by a user, the CPU 10 determines that the recommended display device is OK. Alternatively, if a predetermined time has passed without any manipulation of a user, the CPU 10 may automatically determine that the recommended display device is OK.

Next, if it is determined that the recommended display device is OK (step S142/YES), the setting unit 130 sets, in step S145, the display device as an input unit of the terminal apparatus 1. Specifically, a connection is established to the display device such that the terminal apparatus 1 can transmit image data from the communication unit 17.

In step S146, the terminal apparatus 1 performs control such that image data such as a picture (still image), video (moving image), and game, which is reproduced in the terminal apparatus 1, is displayed on a set display device and the display unit 13 of the terminal apparatus 1, or only on the set display device. Accordingly; for example, when a user is in the house, an optimal display device is recommended in accordance with a time period so that the user can view an image to be reproduced in the terminal apparatus 1 on a display device that wirelessly connects to the terminal apparatus 1.

Meanwhile, if a display device other than the recommended display device is selected by a user (step S142/NO), a setting target is changed, in step S148, to the selected display device. In step S145, the setting unit 130 sets the selected display device as a display unit of the terminal apparatus 1.

As above, the example process of setting a display device (image output apparatus) according to the present embodiment has been described. In addition, if a "next candidate button" (not shown) to be displayed on the display unit 13 is touched is S142 (S142/NP), the recommendation unit 120 may highlight a next recommendation candidate display device.

In S145, when a display device is set as a display unit of the terminal apparatus 1, a connection has been established to the display device. However, timing of a connection according to the present embodiment is not limited thereto. A connection may be automatically established to an optimal (recommended) display device in advance. Next, with reference to FIG. 8, the specific description will be made.

Figure 8:
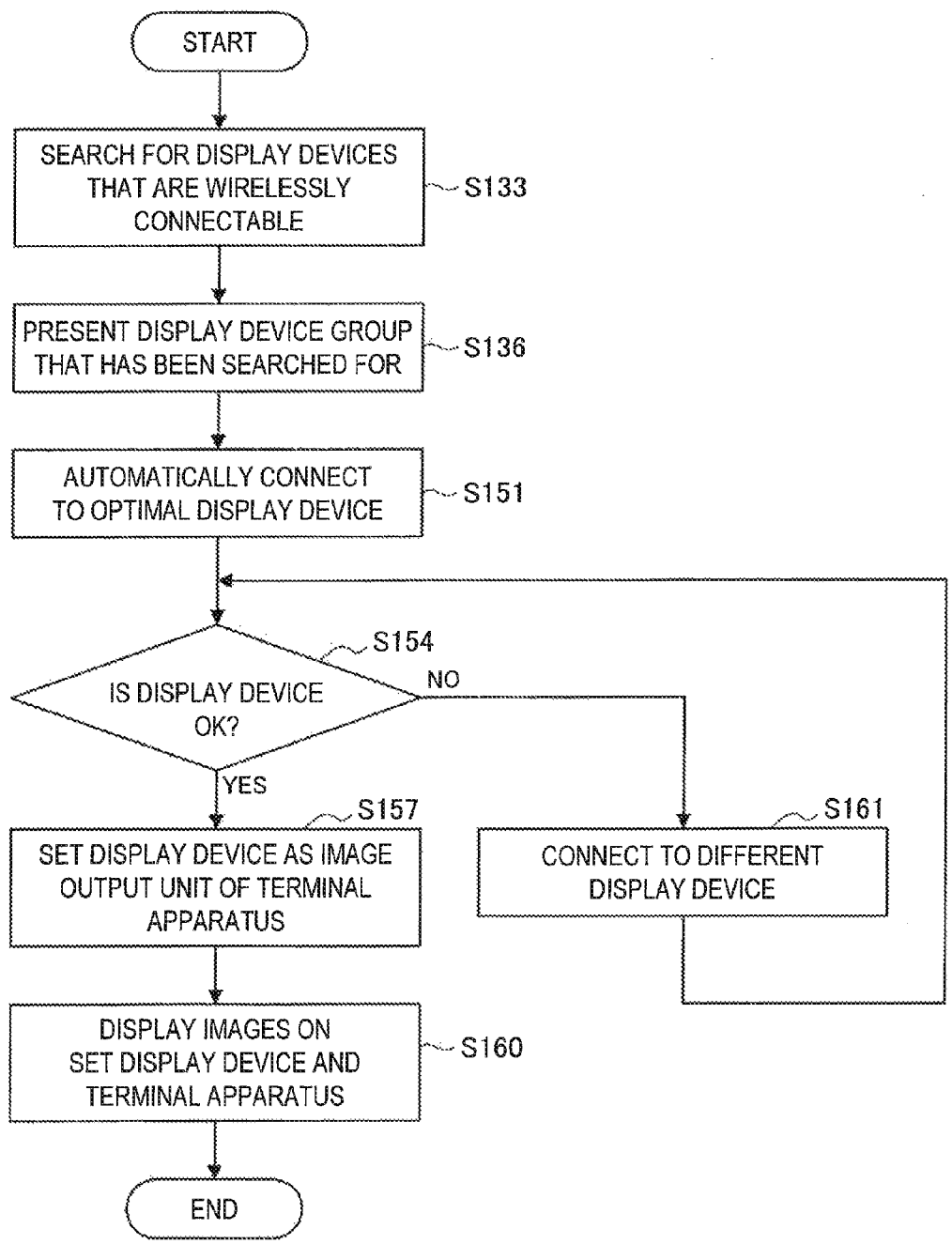
FIG. 8 is a flowchart illustrating another example process of setting a display device according to the second embodiment.

FIG. 8 is a flowchart illustrating another example process of setting a display device according to the second embodiment. As illustrated in FIG. 8, first, in step S133, the search unit 110 of the terminal apparatus 1 searches for display devices that are wirelessly connectable.

Subsequently, in step S136, the CPU 10 presents, to the display unit 13, a display device group that has been searched for by the search unit 110.

Next, in step S151, the CPU 10 automatically connects to an optimal display device that is recommended by the recommendation unit 120 in accordance with, for example, current time, a place in which a user is currently present, or an attribute of the user. The CPU 10 may transmit image data to the automatically connected display device, and may cause the automatically connected display device to display the image data. A user can hereby intuitively recognize the automatically connected display device. Alternatively, the CPU 10 may report, to the user, the automatically connected display device from the display device group presented to the display unit 13, by flashing or highlighting the automatically connected display device.

Subsequently, in step S154, the CPU 10 determines whether the automatically connected display device is OK (decided). Specifically, for example, the user decides selection of a display device by touching an OK button to be displayed on the display unit 13.

Next, if it is determined that the automatically connected display device is OK (step S154/YES), the setting unit 130 sets, in step S157, the display device as a display unit of the terminal apparatus 1.

In step S160, the terminal apparatus 1 transmits image data to be reproduced in the terminal apparatus 1 to the set display device, and causes the set display device to display the image data. For example, when the user is in the house, the user can hereby view an image such as a picture, video, and a game on a high-performance television apparatus that wirelessly connects to the terminal apparatus 1.

To the contrary, if the automatically connected display device is not OK (S154/NO), the CPU 10 automatically connects, in step S161, to a different display device such as a next recommendation display device. The case where the automatically connected display device is not OK means, for example, herein, that a "next candidate button" to be displayed on the display unit 13 is touched or another display device presented to the display unit 13 is selected.

As above, the other example process of setting a display device (image output apparatus) according to the present embodiment has been described.

[3-3. Third Embodiment]

Next, as a third embodiment, an example process of setting an audio output device (audio output apparatus) will be described in reproducing various audio signals such as music and speech. Audio signals are generally output from a speaker (such as an ear piece and a receiver) that is provided in a mobile terminal at a relatively small sound volume. A user directly puts the ear piece over an ear to listen to speech of a partner during a telephone conversation. A user also connects, for example, stereo earphones to an earphone terminal provided on a mobile terminal, and wears the stereo earphones in the ears to listen to sounds of music and a movie in reproducing the music and the movie in the mobile terminal. However, when a user is in the house, there is probably a high-performance audio output apparatus installed around the user.

Accordingly; when there is an audio output device (such as a speaker of an audio apparatus) that attains high performance in outputting audio around the terminal apparatus 1 according to the present embodiment, the terminal apparatus 1 sets the audio output device as an audio signal output unit of the terminal apparatus 1. A user can hereby listen to sounds of music and a movie from a high-performance audio output device. Next, with reference to FIG. 9, such a setting process according to the third embodiment will be specifically described.

Figure 9:
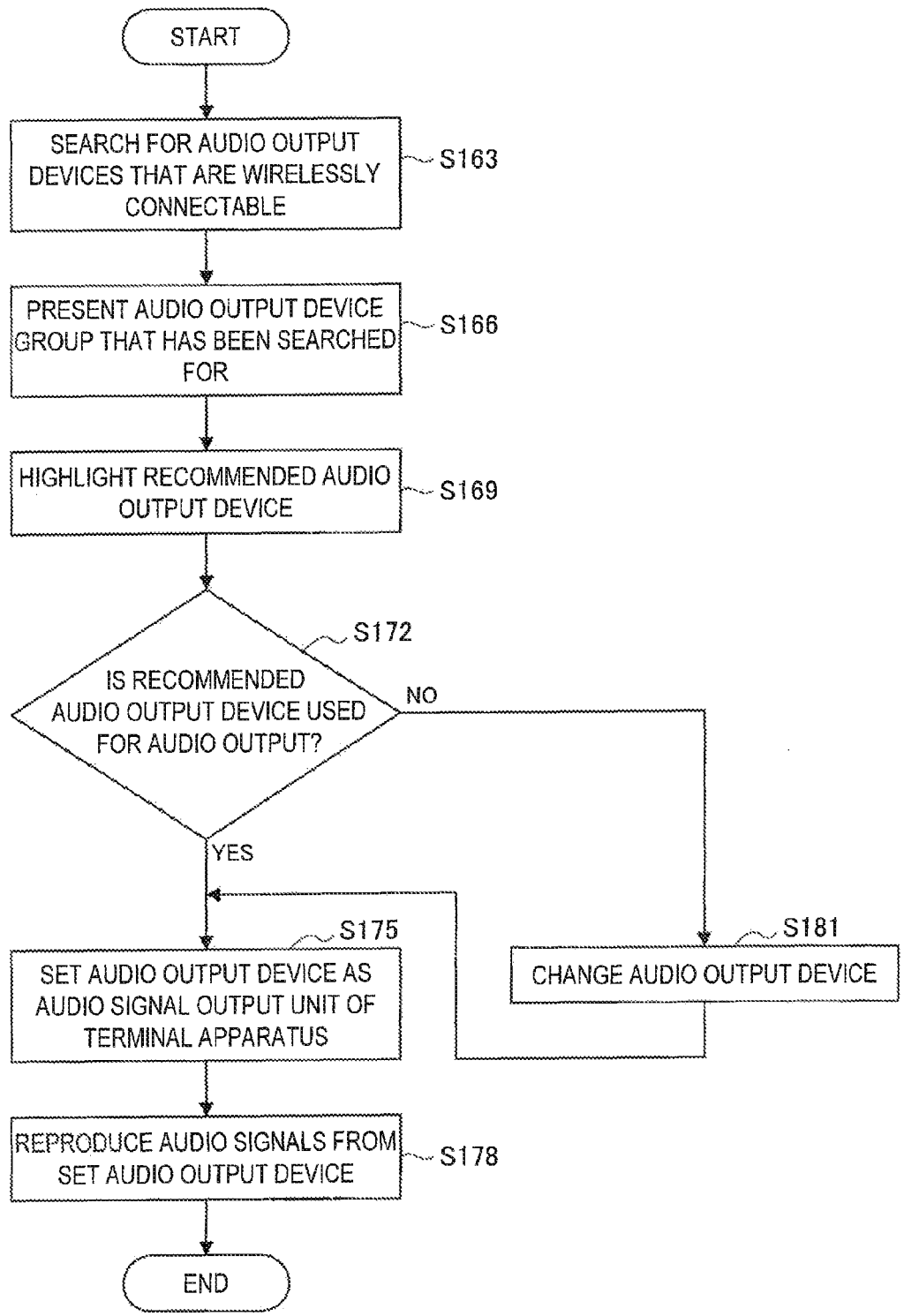
FIG. 9 is a flowchart illustrating an example process of setting an audio output device according to a third embodiment.

FIG. 9 is a flowchart illustrating an example process of setting an audio output device according to the third embodiment. As illustrated in FIG. 9, first, in step S163, the search unit 110 of the terminal apparatus 1 searches for audio output devices that are wirelessly connectable.

Subsequently, in step S166, the CPU 10 presents an audio output device group that has been searched for by the search unit 110 to the display unit 13.

Next, in step S169, the recommendation unit 120 recommends a predetermined optimal audio output device in accordance with, for example, current time, a place in which a user is currently present, or an attribute of the user. Specifically, for example, the recommendation unit 120 highlights an audio output device to be recommended from the audio output device group presented to the display unit 13. Next, with reference to FIG. 10, an example of display screens to be displayed on the display unit 13 will be described.

As illustrated in FIG. 10, the display unit 13 presents, as connectable audio output devices, the audio output device group that has been searched for by the search unit 110. In the example illustrated in FIG. 10, names of the audio output devices are displayed in the form of text. However, the present embodiment is not limited thereto. An image (icon) representing each of the audio output devices may be displayed.

When the recommendation unit 120 recommends a predetermined optimal input device in accordance with a place in which a user is currently present, which means, for example, that the user is in a private space such as the house and current time belongs to a daytime period, a display screen 28 illustrated in FIG. 10 is displayed. As illustrated in FIG. 10, a speaker of an audio apparatus that attains the highest performance (such as sound quality and maximum output) in outputting audio is highlighted and recommended to the user in the display screen 28. Meanwhile, when a user is in a private space such as the house and current time belongs to a nighttime period, the user less possibly listen to music, for example, at a very loud sound volume, but the user probably likes an apparatus at hand, which allows the user to listen to sounds of music and a movie. Accordingly, the recommendation unit 120 highlights and recommends, to the user, as illustrated in a display screen 30 of FIG. 10, an output device such as a speaker of a portable reproduction apparatus other than the output device that attains the highest performance in outputting audio.

Subsequently, in step S172, the CPU 10 determines whether the recommended audio output device is OK (decided). Specifically, if the recommended audio output device is selected by a user, the CPU 10 determines that the recommended audio output device is OK. Alternatively, if a predetermined time has passed without any manipulation of a user, the CPU 10 may automatically determine that the recommended audio output device is OK.

Next, if it is determined that the recommended audio output device is OK (step S172/YES), the setting unit 130 sets, in step S175, the audio output device as an audio signal output unit of the terminal apparatus 1. Specifically, a connection is established to the audio output device such that the terminal apparatus 1 can transmit audio signals from the communication unit 17.

In step S178, the terminal apparatus 1 transmits the audio signals to the set audio output device, and controls the set audio output device to reproduce the audio signals. For example, when a user is in the house, an optimal audio output device is hereby recommended in accordance with a time period so that the user can listen to music to be reproduced in the terminal apparatus 1 from a high-performance audio output device that wirelessly connects to the terminal apparatus 1.

Meanwhile, if an audio output device other than the recommended audio output device is selected by a user (step S172/NO), a setting target is changed, in step S181, to the selected audio output device. In S175, the setting unit 130 sets the selected audio output device as an audio signal output unit of the terminal apparatus 1.

As above, the example process of setting an audio output device (audio output apparatus) according to the present embodiment has been described. In addition, if a "next candidate button" (not shown) to be displayed on the display unit 13 is touched in S172 (S17211\10), the recommendation unit 120 may highlight a next recommendation candidate audio output device.

<4. Conclusion>

As described above, it is possible in the setting system according to the present embodiment to set an input apparatus or an output apparatus around a terminal apparatus as an optimal input unit or an optimal output unit of the terminal apparatus in accordance with a situation. Specifically; the terminal apparatus 1 searches for input/output devices that are present around the terminal apparatus 1 and wirelessly connectable, and recommends a predetermined optimal input/output device from the input/output devices that have been searched for, in accordance with, for example, current time, a current position of a user, and an attribute of the user. The terminal apparatus 1 sets the recommended input/output device as an input/output unit of the terminal apparatus 1, and controls data input to and data output from the input/output device.

When a user is in the house, the user can hereby input data into the terminal apparatus 1 from a high-performance input device such as a keyboard, a mouse, and a controller present around the user, thereby enhancing convenience for the terminal apparatus 1. Additionally, use of a high-performance output device such as a television apparatus, a tablet terminal, and an audio apparatus present around a user allows the user to view and listen to, for example, an image and music to be reproduced in the terminal apparatus 1, and enhances convenience for the terminal apparatus 1.

It should be understood by those skilled in the art that various modifications, combinations, sub-combinations and alterations may occur depending on design requirements and other factors insofar as they are within the scope of the appended claims or the equivalents thereof.

For example, if an input/output device is recommended that can be shared among multiple users, the terminal apparatus 1 may be adjusted such that the input/output device is not recommended when the input/output device has been already used by another user.

In addition, the input/output device may also be a smartphone or a mobile telephone terminal.

If it is determined that no user is present around the terminal apparatus 1, the terminal apparatus 1 may recommend an output device from output devices that have been searched for and present at a current position of the user, which is detected, for example, by motion sensors provided in rooms in the house, and may set the output device as an output unit configured to output ringtones. The terminal apparatus 1 can report an incoming call for the terminal apparatus 1 to a user by outputting the ringtones of the terminal apparatus 1 from the set output device even if the user is in another room.

In addition, the terminal apparatus 1 according to the present embodiment may set not only an input/output device but also a high-performance information processing device present around the terminal apparatus 1 as a processing unit of the terminal apparatus 1, and may cause the set high-performance information processing device to perform processes that are to be performed in the CPU 10. For example, when a user is in the house, an environment is conceivable that a high-performance information processing devices such as a personal-use personal computer and a game device are present around the user. In this case, the terminal apparatus 1 searches for such high-performance information processing devices through the search unit 110, recommends a predetermined optimal information processing device through the recommendation unit 120, and sets the predetermined optimal information processing device as a processing unit through the setting unit 130.

Additionally, the present technology may also be configured as below.

(1) A terminal apparatus including:

a search unit configured to search for an apparatus group including an input apparatus or an output apparatus, the input apparatus and the output apparatus being wirelessly connectable to the terminal apparatus;

a recommendation unit configured to recommend, to a user, a predetermined input apparatus or a predetermined output apparatus from the apparatus group that has been searched for by the search unit, in accordance with current time, a place in which the user is currently present, or an attribute of the user; and a setting unit configured to set the predetermined input apparatus or the predetermined output apparatus as an input unit or an output unit of the terminal apparatus, respectively, the predetermined input apparatus and the predetermined output apparatus having been recommended by the recommendation unit.

(2) The terminal apparatus according to (1), wherein the recommendation unit recommends, to the user, only the predetermined input apparatus.

(3) The terminal apparatus according to (1) or (2), wherein the terminal apparatus is a smartphone or a mobile telephone terminal.

(4) The terminal apparatus according to (1) or (2), wherein the terminal apparatus is a tablet terminal.

(5) The terminal apparatus according to any one of (1) to (4), wherein the setting unit sets, as an input unit or an output unit of the terminal apparatus, an apparatus selected by the user from apparatuses that have been recommended by the recommendation unit.

(6) The terminal apparatus according to any one of (1) to (5), wherein the setting unit automatically sets, as an input unit or an output unit of the terminal apparatus, an apparatus that has been recommended by the recommendation unit.

(7) The terminal apparatus according to any one of (1) to (6), wherein, when the user is in a private space, the recommendation unit recommends a highest-performance apparatus from the apparatus group that has been searched for, and when the user is in a public space, the recommendation unit recommends an apparatus other than the highest-performance apparatus from the apparatus group that has been searched for.

(8) The terminal apparatus according to any one of (1) to (7), wherein the recommendation unit recommends the predetermined input apparatus or the predetermined output apparatus in accordance with whether the current time belongs to a nighttime period or a daytime period, the nighttime period and the daytime period being set in advance.

(9) The terminal apparatus according to any one of (1) to (8), wherein the attribute of the user is information indicating a sex, an age, an occupation, a body shape, or a preference of the user.

(10) The terminal apparatus according to any one of (1) to (9), further including:

a storage unit configured to store the current time, the place in which the user is currently present, or the attribute of the user in association with the predetermined input apparatus or the predetermined output apparatus, wherein the recommendation unit recommends the predetermined input apparatus or the predetermined output apparatus by referring to the association stored in the storage unit.

(11) A non-transitory computer-readable storage medium having a program stored therein, the program causing a computer to function as:

a search unit configured to search for an apparatus group including an input apparatus or an output apparatus, the input apparatus and the output apparatus being wirelessly connectable to a terminal apparatus;

a recommendation unit configured to recommend, to a user, a predetermined input apparatus or a predetermined output apparatus from the apparatus group that has been searched for by the search unit, in accordance with current time, a place in which the user is currently present, or an attribute of the user; and a setting unit configured to set the predetermined input apparatus or the predetermined output apparatus as an input unit or an output unit of the terminal apparatus, respectively, the predetermined input apparatus and the predetermined output apparatus having been recommended by the recommendation unit,

What is claimed is:

1. A terminal apparatus comprising:
   a search unit configured to search for an apparatus group including an input apparatus or an output apparatus, the input apparatus and the output apparatus being wirelessly connectable to the terminal apparatus;
   a recommendation unit configured to recommend, to a user, a predetermined input apparatus or a predetermined output apparatus from the apparatus group that has been searched for by the search unit, in accordance with current time, a place in which the user is currently present, or an attribute of the user; and
   a setting unit configured to set the predetermined input apparatus or the predetermined output apparatus as an input unit or an output unit of the terminal apparatus, respectively, the predetermined input apparatus and the predetermined output apparatus having been recommended by the recommendation unit,
   wherein, when the user is in a private space, the recommendation unit recommends a highest-performance apparatus from the apparatus group that has been searched for, and when the user is in a public space, the recommendation unit recommends an apparatus other than the highest-performance apparatus from the apparatus group that has been searched for.

2. The terminal apparatus according to claim 1, wherein the recommendation unit recommends, to the user, only the predetermined input apparatus.

3. The terminal apparatus according to claim 1, wherein the terminal apparatus is a smartphone or a mobile telephone terminal.

4. The terminal apparatus according to claim 1, wherein the terminal apparatus is a tablet terminal.

5. The terminal apparatus according to claim 1, wherein the setting unit sets, as an input unit or an output unit of the terminal apparatus, an apparatus selected by the user from apparatuses that have been recommended by the recommendation unit.

6. The terminal apparatus according to claim 1, wherein the setting unit automatically sets, as an input unit or an output unit of the terminal apparatus, an apparatus that has been recommended by the recommendation unit.

7. The terminal apparatus according to claim 1, wherein the recommendation unit recommends the predetermined input apparatus or the predetermined output apparatus in accordance with whether the current time belongs to a nighttime period or a daytime period, the nighttime period and the daytime period being set in advance.

8. The terminal apparatus according to claim 1, wherein the attribute of the user is information indicating a sex, an age, an occupation, a body shape, or a preference of the user.

9. The terminal apparatus according to claim 1, further comprising:
   a storage unit configured to store the current time, the place in which the user is currently present, or the attribute of the user in association with the predetermined input apparatus or the predetermined output apparatus, wherein the recommendation unit recommends the predetermined input apparatus or the predetermined output apparatus by referring to the association stored in the storage unit.

10. The terminal apparatus according to claim 1, wherein the terminal apparatus automatically determines that the predetermined input apparatus and the predetermined output apparatus recommended by the recommendation unit are acceptable if a predetermined time has passed without any manipulation of the user.

11. The terminal apparatus according to claim 1, further comprising a display unit configured to display a list of the searched input apparatus or the searched output apparatus within the apparatus group.

12. The terminal apparatus according to claim 11, wherein the predetermined input apparatus or the predetermined output apparatus is highlighted from the apparatus group.

13. The terminal apparatus according to claim 1, wherein the recommendation unit recommends, to the user, the predetermined input apparatus or the predetermined output apparatus from the apparatus group that has been searched for by the search unit, in accordance with sex, age, occupation and body shape of the user.

14. The terminal apparatus according to claim 1, wherein the recommendation unit is further configured to recommend the predetermined input apparatus or the predetermined output apparatus from the apparatus group that has been searched for by the search unit, in accordance with power consumption of the apparatus group.

15. The terminal apparatus according to claim 1, wherein the recommendation unit recommends, to the user, the predetermined input apparatus or the predetermined output apparatus from the apparatus group that has been searched for by the search unit, in accordance with the current time, the place in which the user is currently present, and the attribute of the user.

16. A non-transitory computer-readable storage medium having a program stored therein, the program causing a computer to function as:
    a search unit configured to search for an apparatus group including an input apparatus or an output apparatus, the input apparatus and the output apparatus being wirelessly connectable to a terminal apparatus;
    a recommendation unit configured to recommend, to a user, a predetermined input apparatus or a predetermined output apparatus from the apparatus group that has been searched for by the search unit, in accordance with current time, a place in which the user is currently present, or an attribute of the user; and
    a setting unit configured to set the predetermined input apparatus or the predetermined output apparatus as an input unit or an output unit of the terminal apparatus, respectively, the predetermined input apparatus and the predetermined output apparatus having been recommended by the recommendation unit,
    wherein, when the user is in a private space, the recommendation unit recommends a highest-performance apparatus from the apparatus group that has been searched for, and when the user is in a public space, the recommendation unit recommends an apparatus other than the highest-performance apparatus from the apparatus group that has been searched for.

* * * * *